United States Patent
Paulraj et al.

(10) Patent No.: US 9,125,081 B2
(45) Date of Patent: Sep. 1, 2015

(54) ADAPTIVE CROSS-RADIO ACCESS TECHNOLOGY (RAT) CHANNEL ASSIGNMENT

(71) Applicant: Broadcom Corporation, Irvine, CA (US)

(72) Inventors: Arogyaswami Paulraj, Stanford, CA (US); Murat Mese, Ranchos Palos Verdes, CA (US); Yan Wang, Plano, TX (US); Nihar Jindal, Mountain View, CA (US); Louay Jalloul, San Jose, CA (US); Amin Mobasher, Sunnyvale, CA (US); Sam Alex, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/213,031

(22) Filed: Mar. 14, 2014

(65) Prior Publication Data

US 2014/0307819 A1 Oct. 16, 2014

Related U.S. Application Data

(60) Provisional application No. 61/811,563, filed on Apr. 12, 2013.

(51) Int. Cl.

| | | |
|---|---|---|
| *H04W 4/00* | (2009.01) | |
| *H04W 28/02* | (2009.01) | |
| *H04B 7/04* | (2006.01) | |
| *H04W 24/08* | (2009.01) | |
| *H04W 72/04* | (2009.01) | |
| *H04L 5/00* | (2006.01) | |
| *H04W 24/02* | (2009.01) | |
| *H04W 16/00* | (2009.01) | |
| *H04B 7/06* | (2006.01) | |
| *H04W 88/08* | (2009.01) | |

(52) U.S. Cl.
CPC ......... *H04W 28/0215* (2013.01); *H04B 7/0413* (2013.01); *H04B 7/0452* (2013.01); *H04B 7/0617* (2013.01); *H04L 5/0092* (2013.01); *H04W 16/00* (2013.01); *H04W 24/02* (2013.01); *H04W 24/08* (2013.01); *H04W 72/04* (2013.01); *H04L 5/0023* (2013.01); *H04L 5/0094* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2002/0110105 A1* | 8/2002 | Awater et al. | 370/338 |
| 2009/0316585 A1* | 12/2009 | Srinivasan et al. | 370/241 |
| 2010/0265842 A1* | 10/2010 | Khandekar et al. | 370/252 |
| 2013/0003679 A1* | 1/2013 | Seok et al. | 370/329 |
| 2013/0136018 A1* | 5/2013 | Jeong et al. | 370/252 |
| 2013/0163457 A1* | 6/2013 | Kim et al. | 370/252 |
| 2013/0235814 A1* | 9/2013 | Wietfeldt et al. | 370/329 |
| 2014/0269482 A1* | 9/2014 | Pandey et al. | 370/312 |

* cited by examiner

*Primary Examiner* — Leon-Viet Nguyen
(74) *Attorney, Agent, or Firm* — Sterne, Kessler, Goldstein & Fox P.L.L.C.

(57) ABSTRACT

Systems and methods for channel assignment configuration in a multiple access point (AP) environment are provided. The multiple APs can be homogeneous or heterogeneous and can implement one or more radio access technologies (RATs), including Massive Multiple Input Multiple Output (M-MIMO) RATs. A channel assignment configuration for a user equipment (UE) can identify one or more communication channels to be established to serve the UE by one or more of the APs.

20 Claims, 4 Drawing Sheets

ADAPTIVE CROSS-RADIO ACCESS TECHNOLOGY (RAT) CHANNEL ASSIGNMENT

CROSS-REFERENCE TO RELATED APPLICATION(S)

The present application claims the benefit of U.S. Provisional Application No. 61/811,563, filed Apr. 12, 2013, which is incorporated herein by reference in its entirety.

TECHNICAL FIELD

The present disclosure relates generally to adaptive cross-radio access technology (RAT) channel assignment.

BACKGROUND

Background Art

Future wireless environments are envisioned to include access points (APs) for multiple radio access technologies (RATs) operating in close proximity to each other. These APs may include Massive Multiple Input Multiple Output (M-MIMO) APs equipped with a very large number of transmit/receive antennas (e.g., 32, 64, or 100) that can be used for simultaneous communication with one or more terminals.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, or hardware (such as one or more circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

For the purposes of this discussion, the term "processor circuitry" shall be understood to include one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according, to embodiments described herein. Alternatively, the processor can access an internal or external memory to retrieve instructions stored in the memory, which when executed by the processor, perform the corresponding function(s) associated with the processor.

Figure 1:
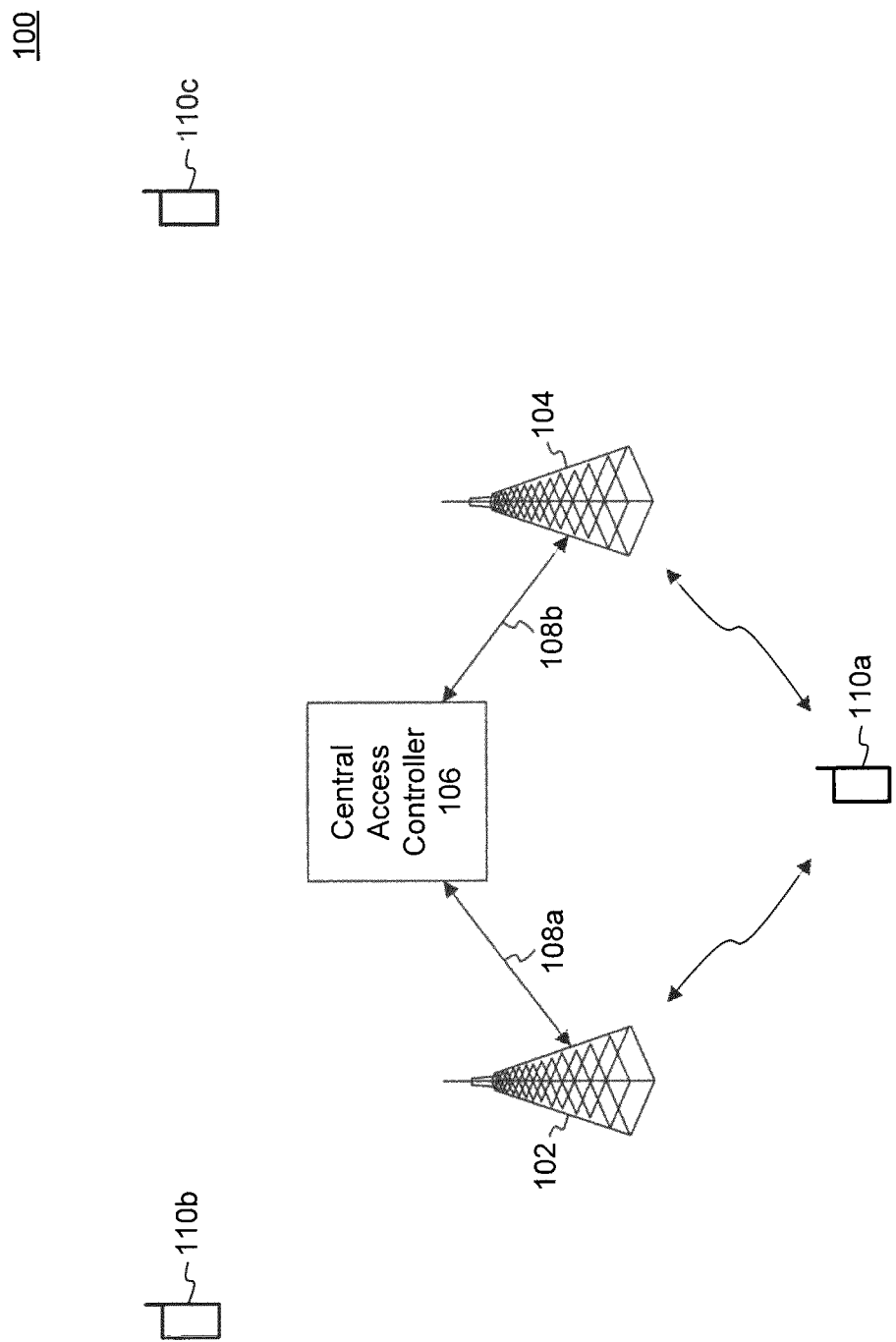
FIG. 1 illustrates an example environment in which embodiments can be implemented or practiced.

FIG. 1 illustrates an example environment 100 in which embodiments can be implemented or practiced. Example environment 100 is provided for the purpose of illustration only and is not limiting of embodiments. As shown in FIG. 1, example environment 100 includes a first Access Point (AP) 102, a second AP 104, a central access controller 106, and a plurality of user equipments (UEs) 110a, 110b, and 110c. As would be understood by a person of skill in the art based on the teachings herein, in other embodiments, example environment 100 can include more or less APs and UEs than shown in FIG. 1.

APs 102 and 104 can be Wireless Local Area Network (WLAN) APs, cellular network base stations, Bluetooth APs, or other wireless multi-access radio network APs. As further described below, APs 102 and 104 may be homogeneous or heterogeneous. In the homogeneous case, APs 102 and 104 have the same capabilities, including maximum transmit power, antenna configuration, and enabled radio access technologies (RATs), for example. For instance, APs 102 and 104 can both be high power/large cell (e.g., macrocell) APs that have an omni-directional antenna configuration and that support the Long Term Evolution (LTE) protocol. Alternatively, APs 102 and 104 can both be low power/small cell (e.g., femtocell, picocell, etc.) APs that support both the LTE and WLAN protocols. In the heterogeneous case, APs 102 and 104 have different capabilities, including maximum transmit power, antenna configuration, and enabled RATs, for example. For instance, AP 102 may be a high power/large cell LTE evolved Node B (eNB) and AP 104 may be a low power/small cell WLAN AP. In another example, AP 102 may include a Massive Multiple Input Multiple Output (M-MIMO) antenna array that supports highly-directional M-MIMO communication, whereas AP 104 may include only a small number of antennas that enable omni-directional communication only.

UEs 110a, 110b, and 110c are located in a vicinity of APs 102 and 104. In an embodiment, any of UEs 110a, 110b, and 110c are within the wireless coverage of any of APs 102 and 104. Alternatively, some of UEs 110a, 110b, and 110c can be within the wireless coverage of only one of APs 102 and 104. In embodiments, UEs 110a, 110b, and 110c can be WLAN user stations (STAs), cellular UEs, Bluetooth devices, and/or other wireless RAT devices.

Central access controller 106 is communicatively coupled to APs 102 and 104. In an embodiment, central access controller 106 is communicatively coupled directly to APs 102 and 104 via links 108a and 108b respectively. Links 108a and 108b may be wired or wireless. For example, links 108a and 108b may be optical fiber or microwave links. In another embodiment, central access controller 106 is communicatively coupled to APs 102 and 104 via one or more intermediate entities. For example, central access controller 106 can be coupled to a core network entity (not shown in FIG. 1), which is coupled to APs 102 and 104 via a backhaul network (not shown in FIG. 1), or to two core network entities each of which is coupled to a respective one of APs 102 and 104 (when APs 102 and 104 do not belong to the same wireless network or to linked wireless networks). In a further embodiment, central access controller 106 is part of AP 102 or AP 104.

In an embodiment, central access controller 106 is configured to collect AP information associated with APs 102 and 104 and UE information associated with UEs 110a, 110b, and 110c. In an embodiment, the AP information and the UE information are sent to central access controller 106 from APs 102 and 104. In another embodiment, central access controller 106 retrieves the AP information and the UE information via one or more core network entities, coupled to APs 102 and 104. In a further embodiment, central access controller 106 may eavesdrop on communication within example environment 100 to collect some of the AP information and/or some of the UE information.

In an embodiment, the AP information includes information regarding the capabilities of APs 102 and 104. For example, AP information associated with AP 102 or AP 104 can include, without limitation, information regarding one or more of: a maximum transmit power of the AP, supported RATs at the AP (e.g., LTE, LTE-Advanced, WLAN, Bluetooth, etc.), an antenna configuration of the AP (e.g., number of transmit/receive antennas, omni-directional, fixed sector omni-directional, directional, MIMO, M-MIMO, etc.), M-MIMO communication availability at the AP (e.g., presence/absence of a M-MIMO antenna array, instantaneous usage availability of the M-MIMO antenna array, etc.), capacity of a backhaul link of the AP, and latency of the backhaul link of the AP.

The UE information includes information associated with one or more of UEs 110a, 110b, and 110c. For example, UE information associated with one of UEs 110a, 110b, and 110c can include, without limitation, information regarding one or more of: supported RATs at the UE, an antenna configuration at the UE (e.g., number of transmit/antennas, omni-directional, fixed sector omni-directional, directional, MIMO, M-MIMO, etc.), M-MIMO communication availability at the UE (e.g., presence/absence of a M-MIMO antenna array, instantaneous usage availability of the M-MIMO antenna array, etc.), instantaneous data traffic characteristics of the UE (e.g., number of data streams (i.e., rank) of the UE, data traffic type (e.g., video, voice, etc.), data traffic Quality of Service (QoS) requirements, average uplink/downlink burst size, etc.), a current serving AP (or APs) of the UE, a current receive power at the UE due to the current serving AP(s), a current estimate of a downlink channel from the current serving AP(s) to the UE, a location of the UE (e.g., GPS location or approximate location based on current serving AP), and a battery level of the UE.

In an embodiment, central access controller 106 is configured to generate a channel assignment configuration for at least one of UEs 110a, 110b, and 110c based on the AP information and the UE information. For example, central access controller 106 may generate a channel assignment configuration for UE 110a. The channel assignment configuration identifies one or more communication channels to be established to serve UE 110a by APs 102 and/or 104. Central access controller 106 sends the channel assignment configuration to the AP(s) indicated in the channel assignment configuration. As would be understood by a person of skill in the art based on the teachings herein, central access controller 106 may also generate channel, assignment configurations for UEs 110b and 110c in the same fashion.

For example, the channel assignment configuration may identify a first communication channel to be established between AP 102 and UE 110a and/or a second communication channel to be established between AP 104 and UE 110a. The channel assignment configuration may further identify, for example, the first communication channel as a data channel (e.g., for carrying user data traffic) and the second communication channel as a control channel (e.g., for carrying control information). Alternatively, the channel assignment configuration may identify both the first and second communication channels as data channels. For example, the channel assignment configuration may identify the first communication channel as a primary data channel and the second communication channel as a secondary data channel. In an embodiment, the secondary data channel may be used when the primary data channel fails, when the data traffic exceeds the capacity of the primary data channel, or when the data traffic is of a particular type (e.g., video).

In embodiments, the first communication channel and the second communication channel can be of the same RAT or of different RATs depending on the capabilities of APs 102 and 104 and of UE 110a. For example, the first communication channel may be an LTE channel and the second communication, channel may be a WLAN channel, or vice versa. In another example, the first communication channel utilizes a M-MIMO RAT and the second communication channel utilizes a non-M-MIMO (e.g., legacy) RAT.

In an embodiment, the channel assignment configuration can include a number of parameters related to each of the one or more communication channels to be established. For example, in addition to identifying the communication channel end nodes (e.g., AP 102 and UE 110a), the RAT of the communication channel, and the traffic type (e.g., data, control) to be carried over the communication channel, in an embodiment, the channel assignment configuration further identifies the downlink/uplink time and frequency resources associated with the communication channel; the downlink/uplink modulation and coding, schemes (MCS) associated with the communication channel; the number(s) of simultaneous (e.g., in time and frequency) downlink/uplink data streams to be carried by the communication channel, the transmit power(s) associated with the communication channel, etc.

Channels as described herein can be defined in time, frequency, and/or spatially. For example, a channel can be a logical channel that exists during defined time intervals. Alternatively or additionally, the channel can exist over a defined frequency subset of a frequency band. Alternatively or additionally, the channel can be associated with a spatial direction.

In a further embodiment, where the RAT associated with the communication channel is a M-MIMO RAT, the channel assignment configuration can further include M-MIMO parameters for MIMO communication over the communication channel. The M-MIMO parameters can include one or more of: a number of transmit/receive antennas for use in the M-MIMO communication over the communication channel, a selection between Single User MIMO (SU-MIMO) and Multi-User MIMO (MU-MIMO) for the M-MIMO communication (e.g., depending on whether the communication channel is used to serve other UEs simultaneously), a number of users in the case of MU-MIMO, and a transmit precoder for use in the M-MIMO communication over the communication channel.

In embodiments, the channel assignment configuration for a particular UE can be statically, semi-statically, or dynamically determined based on the AP information and the UE information. Where the channel assignment configuration is semi-statically or dynamically determined, central access controller 106 is configured to detect changes in the AP information and/or the UE information and to adjust the channel assignment configuration partially or entirely in response to the detected changes.

For example, in an embodiment, where the first communication channel identified in the channel assignment configuration for UE 110a corresponds to a data channel, central access controller 106 can be configured to detect a change of in the data traffic characteristics of 110a and to generate a second channel assignment configuration for UE 110a responsive to the detected change. The second channel assignment configuration can, for example, identify a third communication channel to be established to serve UE 110a instead of, or in addition to, the first communication channel. The change in the data traffic characteristics of UE 110a can include a change in traffic type, traffic QoS, and/or traffic statistic. For example, in an embodiment, the change in the data traffic characteristics of UE 110a can correspond to an increase in an average burst size of downlink data traffic to UE 110a. Accordingly, the second channel assignment configuration may identify the third communication channel as using a M-MIMO RAT to support the higher burst size downlink data traffic to UE 110a.

In another embodiment, where the first communication channel identified in the channel assignment configuration for UE 110a is established using M-MIMO communication between AP 102 and UE 110a, central access controller 106 can be configured to detect a change in a battery level of UE 110a and to adjust the M-MIMO parameters of the M-MIMO communication over the first communication channel responsive to the detected change. For example, central access controller 106 may increase the number of transmit antennas used by AP 102 and reduce the number of receive antennas used by UE 110a for the M-MIMO communication in response to detecting that the battery level of UE 110a has fallen below a threshold. Alternatively, or additionally, central access controller 106 may reduce or increase the number of data streams carried by the M-MIMO communication. Such adjustments can reduce the amount of receive processing required at UE 110a or reduce the amount of time that UE 110a spends receiving a given packet and can prolong battery life at UE 110a. Central access controller 106 can decide whether to reduce or increase the number of data streams depending on which option is more beneficial to the UE.

Figure 2:
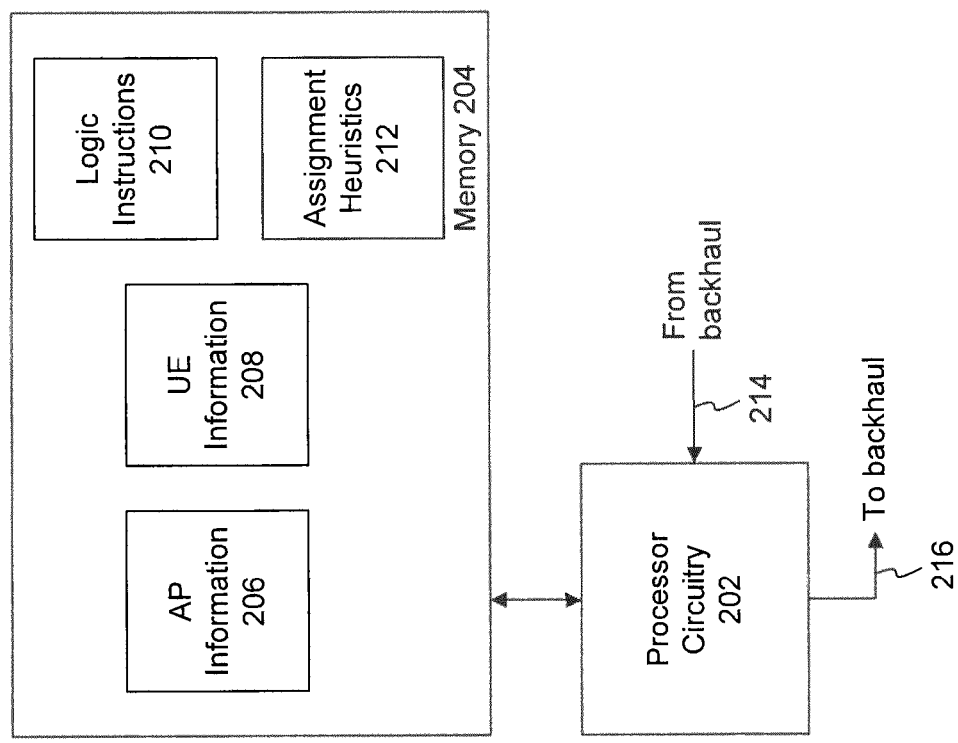
FIG. 2 illustrates an example central access controller according to an embodiment.

FIG. 2 illustrates an example central access controller 200 according to an embodiment. Example controller 200 is provided for the purpose of illustration only and is not limiting of embodiments. Example controller 200 can be an embodiment of central access controller 106 described above. As shown in FIG. 2, example controller 200 includes, without limitation, a processor 202 communicatively coupled to a memory 204. Memory 204 is configured to store, without limitation, AP information 206, UE information 208, logic instructions 210, and assignment heuristics 212.

In an embodiment, processor 202 is configured to receive AP information and UE information via an input interface 214 and to cause the AP information and UE information to be stored in memory 204 as AP information 206 and UE information 208 respectively. In one embodiment, input interface 214 is coupled to one or more backhaul links that connect central access controller 200 to one or more respective core network entities.

In another embodiment, processor 202 is configured to execute logic instructions 210 stored in memory 204 to perform the central access controller functions described herein.

For example, in an embodiment, processor 202 can execute logic instructions 210 to generate a channel assignment configuration for a UE based on AP information 206 and/or UE information 208. In one embodiment, logic instructions 210 rely on assignment heuristics 212, which provide heuristics and/or algorithms for generating channel assignment configurations. Processor 202 forwards the generated channel assignment configuration via an output interface 216. In an embodiment, output interface 216 is coupled to one or more backhaul links that connect central access controller 200 to one or more respective core network entities.

Figure 3:
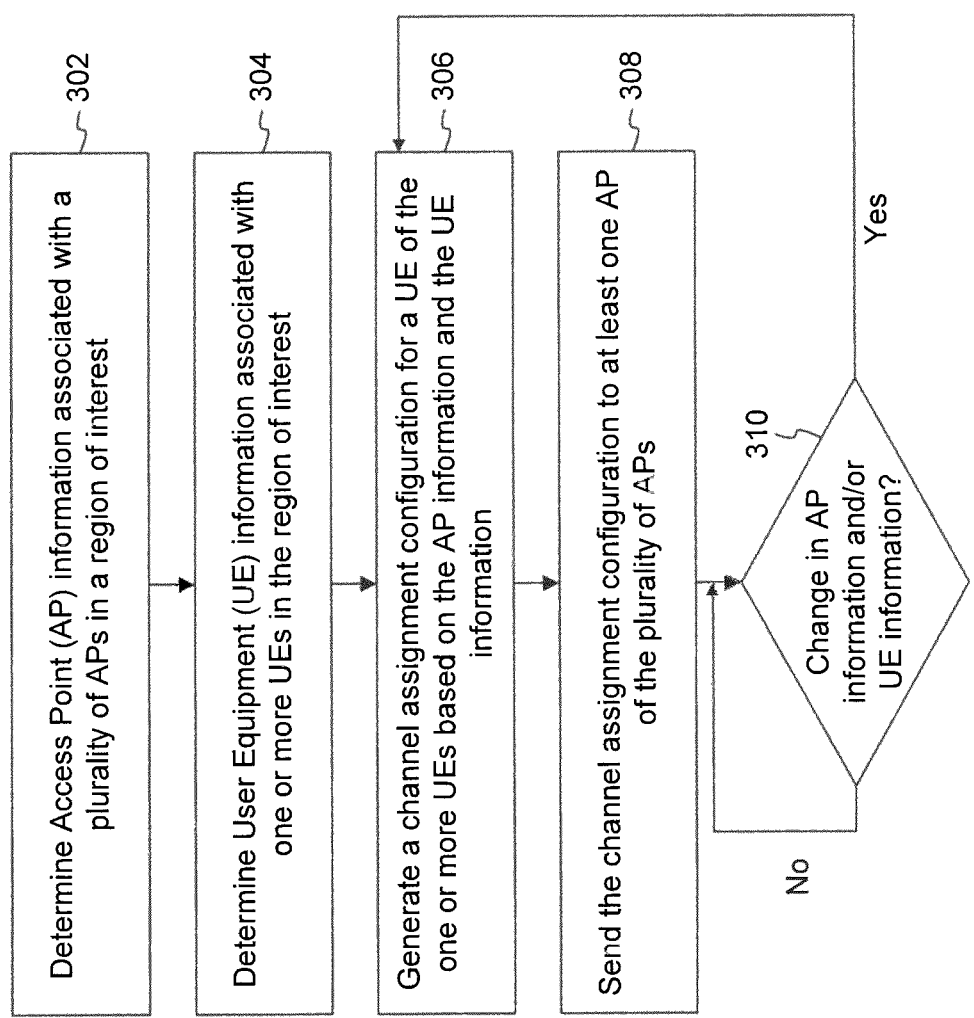
FIG. 3 illustrates an example process according to an embodiment.

FIG. 3 illustrates an example process 300 according to an embodiment. Example process 300 is provided for the purpose of illustration only and is not limiting of embodiments. Example process 300 can be performed by a central access controller, such as central access controller 106, but can also be performed by a different entity, including an AP. Example process 300 can be used to generate and implement a channel assignment configuration for one or more UEs in a region of interest. As would be understood by a person of skill in the art based on the teachings herein, steps 302 and 304 of process 300 can be interchanged or performed simultaneously in other embodiments.

As shown in FIG. 3, process 300 begins in step 302, which includes determining AP information associated with a plurality of APs in the region of interest. As described above, the AP information may be collected through various ways, including directly from the APs, from one or more core network entities via the backhaul network, or by eavesdropping. In an embodiment, the AP information includes information regarding the capabilities of the plurality of APs including, without limitation, information regarding one or more of: maximum transmit powers of the APs, supported RATs at the APs (e.g., LTE LTE-Advanced, WLAN, Bluetooth, etc.), antenna configurations of the APs (e.g., number of transmit/receive antennas, omni-directional, fixed sector omni-directional, directional, MIMO, M-MIMO, etc.), M-MIMO communication availability at the APs (e.g., presence/absence of a M-MIMO antenna array, instantaneous usage availability of the M-MIMO antenna array, etc.), capacity of backhaul links of the APs, and latency of the backhaul links of the APs.

Subsequently, process 300 proceeds to step 304, which includes determining UE information associated with one or more UEs in the region of interest. Like the AP information, the UE information can also be collected in various ways according to embodiments, including directly from the APs, from one or more core network entities via the backhaul network, or by eavesdropping. In an embodiment, the UE information includes information associated with the one or more of UEs. The information associated with a UE can include, without limitation, information regarding one or more of: supported RATs at the UE, an antenna configuration at the UE (e.g., number of transmit/antennas, omni-directional, fixed sector omni-directional, directional, MIMO, M-MIMO, etc.), M-MIMO communication availability at the UE (e.g., presence/absence of a M-MIMO antenna array, instantaneous usage availability of the M-MIMO antenna array, etc.), instantaneous data traffic characteristics of the UE (e.g., number of data streams (i.e., rank) of the UE, data traffic type (e.g., video, voice, etc.), data traffic Qos requirements, average uplink/downlink burst size, etc.), a current serving AP (or APs) of the UE, a current receive power at the UE due to the current serving AP(s), a current estimate of a downlink channel from the current serving AP(s) to the UE, a location of the UE (e.g., GPS location or approximate location based on current serving AP), and a battery level of the UE.

Process 300 then proceeds to step 306, which includes generating a channel assignment configuration for a UE of the one or more UEs based on the AP information and the UE information. As described above, the channel assignment configuration can identify any number of communication channels to be established between one, or more of the plurality of APs and the UE. The channel assignment configuration channel can identify each of the communication channels as a data channel or a control channel, specify the RAT of each of the communication channels, and specify communication parameters related to each of the communication channels.

In an embodiment, process 300 terminates in step 308, which includes sending the channel assignment configuration to at least one AP of the plurality of APs. In an embodiment, step 308 includes sending the channel assignment configuration to the AP(s) identified in the channel assignment configuration. In another embodiment, the channel assignment configuration is shared with all of the plurality of APs. In a further embodiment, the channel assignment configuration is also shared with the UE itself.

In another embodiment, process 300 proceeds to step 310 after step 308. Step 310 includes detecting a change in the AP information and/or the UE information. If no change is detected, process 300 loops back to step 310, e.g., after a predetermined delay. Otherwise, process 300 returns to step 306 to adjust the channel assignment configuration partially or entirely in response to the detected change. Example changes that can trigger an adjustment of the channel assignment configuration (e.g., change in the data traffic characteristics of the UE, change in the battery level of the UE, etc.) and example adjustments in response to the changes are described above with reference to FIG. 2, for the purpose of illustration only and not limitation.

Figure 4:
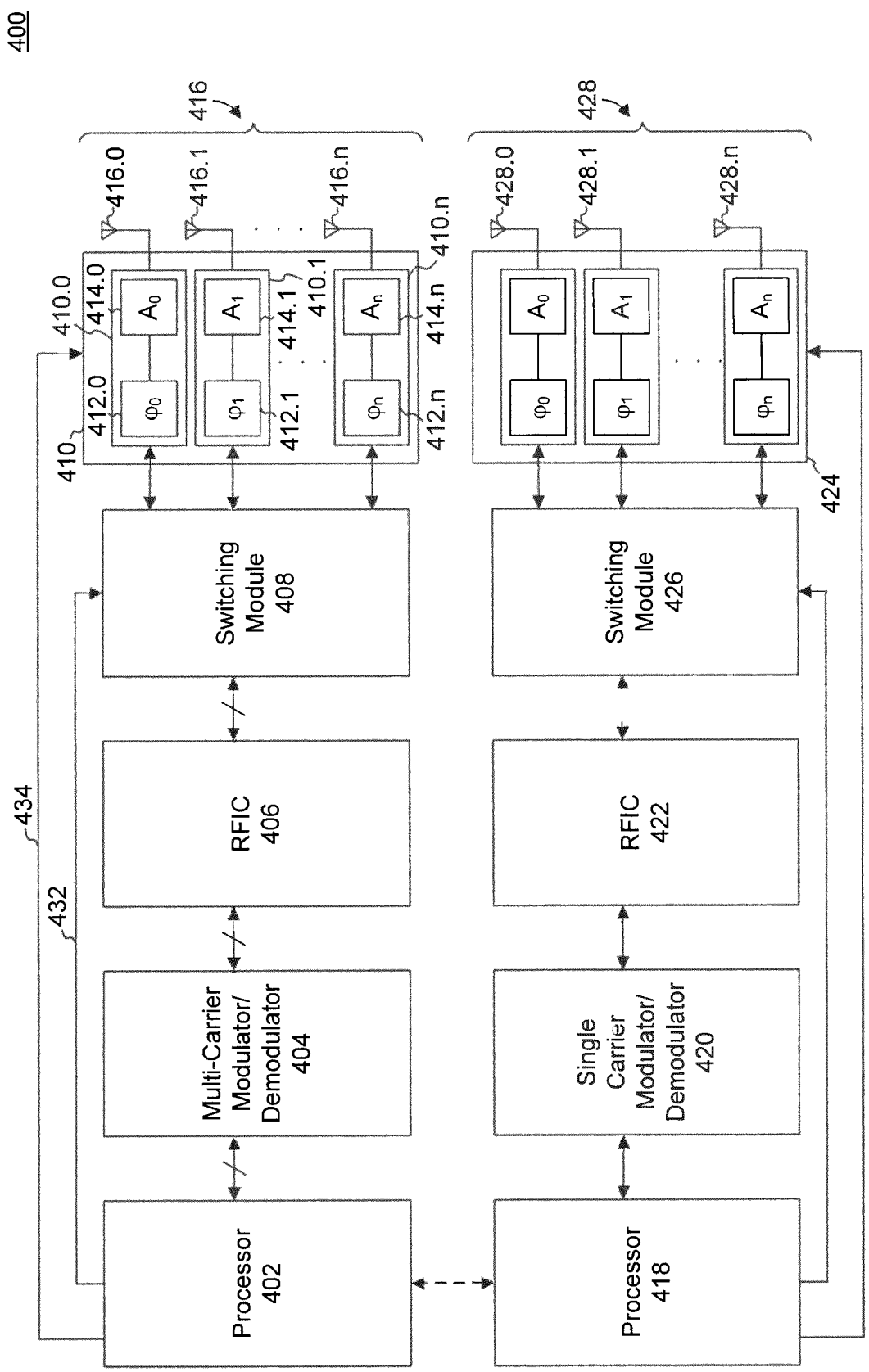
FIG. 4 illustrates an example access point according to an embodiment.

FIG. 4 illustrates an example AP 400 according to an embodiment. Example AP 400 is provided for the purpose of illustration only and is not limiting of embodiments. Example AP 400 can be an embodiment of AP 102 or AP 104 for example. In an embodiment, example AP 400 can be used to support at least two different M-MIMO RATs (e.g., M-MIMO LTE and M-MIMO WLAN) and to implement embodiments as described herein, including implementing a channel assignment configuration provided by a central access controller.

As shown in FIG. 4, example AP 400 includes, without limitation, a first transmit/receive chain for enabling, a first RAT and a second transmit/receive chain for implementing a second RAT. The first transmit/receive chain includes, without limitation, a processor 402, a multi-carrier modulator/demodulator 404, a radio frequency integrated circuit (RFIC) 406, a switching module 408, an antenna array controller 410, and a M-MIMO antenna array 416, including a plurality of antenna elements 416.0, 416.1, . . . , 416.n. In an embodiment, processor 402 includes an embedded memory for storing logic instructions that can be executed by processor 402 to perform the functions described herein. In another embodiment, the memory is external to processor 402. In an embodiment, the first transmit/receive chain can be used to implement a multi-carrier based RAT, such as LTE, for example.

The second transmit/receive chain is similar to the first transmit/receive chain, and includes, without limitation, a processor 418, a single carrier modulator/demodulator 420, a RFIC 422, a switching module 426, an antenna array controller 424, and a M-MIMO antenna array 428, including a plurality of antenna elements 428.0, 428.1, . . . , 428.n. In an embodiment, the second transmit/receive chain can be used to implement a single carrier based RAT, such as WLAN, for example. As would be understood by a person of skill in the art based on the teachings herein, in other embodiments, some of the components of AP 400 can be reused across different RATs and can therefore be eliminated. For example, in an embodiment, a single M-MIMO antenna array, antenna array controller, switching module, RFIC, modulator/demodulator, and/or processor can be shared across the different RATs.

In an embodiment, AP 400 is configured to receive a channel assignment configuration for a UE in the vicinity of AP 400. The channel assignment configuration can be received using either one or both of the first and second, transmit/receive chains. Alternatively, AP 400 receives the channel assignment configuration via a backhaul link, not shown in FIG. 4. For the purpose of illustration only, it is assumed herein that the channel assignment configuration identifies a first (data) communication channel to be established using the first RAT between AP 400 and the UE, and a second control communication channel to be established using the second RAT between AP 400 and the UE. As would be understood by a person of skill in the art based on the teachings herein, the channel assignment configuration may identify further communication channels to be established by other APs, which would operate similar to AP 400 to establish those channels. For illustration only, it is further assumed that the first communication channel is identified as a M-MIMO communication channel and that the second (control) communication channel is identified as a non-M-MIMO communication channel by the channel assignment configuration.

After receiving the channel assignment configuration, AP 400 can be configured to respond to one or more attachment requests from the UE. For example, one or more of the first and second communication channels may require attachment before data/control traffic can be served to the UE. In another embodiment, no attachment is required. In a further embodiment, AP 400 can be configured to instruct the UE to transmit pilot signals for estimating the uplink/downlink channel corresponding to the first communication channel.

In an embodiment, once AP 400 obtains an estimate of the downlink channel to the UE, AP 400 can use the first transmit/receive chain to serve downlink data traffic to the UE using M-MIMO communication according to the channel assignment configuration, thereby establishing the first communication channel.

In an embodiment, processor 402 includes a baseband processor which generates one or more (e.g., N) symbol streams (not shown in FIG. 4) for transmission by AP 400 over the same time and frequency resources. The symbol streams each typically comprises a sequence of modulated symbols. The symbol streams can be different from each other. Alternatively, some of the symbol streams can be duplicate. The symbol streams are generally intended for one or more UEs (e.g., K UEs) served by AP 400.

The UE associated with the received channel assignment configuration may be the intended recipient of one or more or none of the symbol streams transmitted by AP 400 at any given time. In an embodiment, the symbol stream(s) for the UE result from modulating and/or coding respective bit streams according to modulation and coding schemes identified by the channel assignment configuration. As further described below, in an embodiment, AP 400 can be configured to transmit the one or more symbol streams such that the symbol stream(s) intended for the UE associated with the received channel assignment configuration is (are) transmitted over the first communication channel in accordance the channel assignment configuration. Other symbol streams are transmitted to other UEs over respective communication channels, which in turn may have been identified by respective channel assignment configurations associated with the other UEs.

The one or more symbol streams are provided to multi-carrier modulator/demodulator 404. In an embodiment, multi-carrier modulator/demodulator 404 includes an Inverse Fast Fourier Transform (IFFT) module and a Fast Fourier Transform (FFT) module. Multi-carrier modulator/demodulator 404 modulates the symbol streams onto one or more physical resources of a multi-carrier frame (e.g., Orthogonal Frequency Division Multiplexing (OFDM) frame) at the control of processor 402. As understood by a person of skill in the art, a multi-carrier frame, such as an OFDM frame, corresponds to a grid of physical resources, with each physical resource being associated with a respective time slot (or symbol) and frequency sub-carrier of the multi-carrier frame.

In an embodiment, multi-carrier modulator/demodulator 404 modulates the symbol streams onto physical resources of the multi-carrier frame that correspond to downlink time/frequency resources identified by the channel assignment configuration. In an embodiment, the symbol streams are modulated onto different physical resources of the multi-carrier frame. In another embodiment, the symbol streams are modulated onto the same time and frequency physical resources of the multi-carrier frame, but are pre-coded in such a manner that they are transmitted on spatially orthogonal paths by M-MIMO antenna array 416. As further described below, in embodiments, the pre-coding can be performed by applying a transmit precoder matrix to the symbol streams before multi-carrier modulation and/or by applying a transmit weight vector to the antenna signals prior to transmission. In the former case, the pre-coding can be performed on a physical resource basis, a sub-carrier basis, or a timeslot basis (e.g., OFDM symbol basis). In the latter case, the pre-coding is applied in the time domain on a multi-carrier modulated signal.

In an embodiment, processor 402 selects a subset of M-MIMO antenna array 416 (which can be the entire M-MIMO antenna array 416) for transmitting the one or more symbol streams. In an embodiment, the subset of M-MIMO antenna array 416 is identified by the received channel assignment configuration. Based on the size of the selected subset of M-MIMO antenna array 416 and the number of symbol streams being transmitted, processor 402 determines a transmit precoder matrix for pre-coding the one or more symbol streams.

Processor 402 then pre-codes the one or more symbol streams using the transmit precoder matrix to generate a plurality of signals. Depending on the actual values of the transmit precoder matrix, the plurality of signals can each correspond to an amplitude and/or phase adjusted version of a single symbol stream, or one or more of the plurality of signals can be a weighted combination of the one or more symbol streams. In an embodiment, processor 402 is configured to determine the transmit precoder matrix based at least in part on the estimate of the downlink channel to the UE associated with the channel assignment configuration. In another embodiment, processor 402 determines the transmit precoder matrix such that transmission of the plurality of signals by M-MIMO antenna array 416 results in each symbol stream of the one or more symbol streams being beamformed to its intended UE. In a further embodiment, the transmit precoder matrix is provided by the channel assignment configuration to AP 400.

The plurality of signals resulting from the pre-coding of the first and second user data symbol streams are provided by processor 402 to multi-carrier modulator/demodulator 404.

In an embodiment, as described above, multi-carrier modulator/demodulator 404 modulates the plurality of signals onto the same time and frequency resources. This is equivalent to having multiple parallel (time and frequency synchronized) OFDM frames, with each signal of the plurality of signals being mapped to one of the multiple parallel OFDM frames such that all signals occupy in their respective OFDM frames the same time and frequency resources.

The plurality of signals modulated by multi-carrier modulator/demodulator 404 are then provided to RFIC 406, RFIC 406 includes analog hardware circuits and/or components such as filters, frequency up-converters, and power amplifiers. RFIC 406 acts on the plurality of signals to generate a respective plurality of carrier-modulated signals. The plurality of carrier-modulated signals are then provided to switching module 408. Switching module 408 is controllable by processor 402 by means of a control signal 432 to couple the plurality of carrier-modulated signals to M-MIMO antenna array 416. In an embodiment, processor 402 controls switching module 408 to couple the plurality of carrier-modulated signals to respective antenna elements of the selected subset of M-MIMO antenna array 416. In an embodiment, switching module 408 couples the plurality of carrier-modulated signals to M-MIMO antenna array 416 via antenna array controller 410 as further described below.

Antenna array controller 410 is coupled between switching module 408 and M-MIMO antenna array 416. In an embodiment, antenna array controller 410 includes a plurality of antenna controllers 410.0, 410.1, . . . , 410.$n$ that correspond respectively to antenna elements 416.0, 416.1, . . . , 416.$n$ of M-MIMO antenna array 416. In an embodiment, each antenna controller 410.0, 410.1, . . . , 410.$n$ includes a respective phase controller 412 and a respective amplitude controller 414. Antenna array controller 410 can be implemented using digital and/or analog components.

In an embodiment, processor 402 controls antenna array controller 410 by means of a control signal 434. In another embodiment, processor 402 controls antenna array controller 410 using control signal 434 to activate one or more of antenna controllers 410.0, 410.1, . . . , 410.$n$ depending on which of antenna elements 416.0, 416.1, . . . , 416.$n$ is being used for transmission or reception. In an embodiment, when an antenna element 416.0, 416.1, . . . , 416.$n$ is used for transmission or reception, its corresponding, antenna controller 410.0, 410.1, . . . , 410.$n$ is active. A phase shift can be applied to a signal being transmitted or received by an antenna element 416.0, 416.1, . . . , 416.$n$ using its respective phase controller 412.0, 412.1, . . . , 412.$n$. An amplitude amplification/attenuation can be applied to a signal being transmitted or received using an antenna element 416.0, 416.1, . . . , 416.$n$ using its respective amplitude controller 414.0, 414.1, . . . , 414.$n$. In an embodiment, the phase shift and amplitude amplification/attenuation are applied in the time domain to the signal.

In an embodiment, processor 402 determines, based on one or more of: a desired transmit beam pattern, the downlink channel to the UE, the transmit precoder matrix, and the selected subset of antenna elements used for transmission, a transmit weight vector for antenna array controller 410. In an embodiment, the transmit weight vector includes a complex element for each antenna controller 410.0, 410.1, . . . , 410.$n$, which determines the respective phase shift and amplitude amplification/attenuation to be applied by the antenna controller to the signal being transmitted by its respective antenna element. Hence, as described above, antenna array controller 410 provides an additional layer for shaping, the transmit beam pattern of M-MIMO antenna array 416, and can be used with or without the above described symbol stream precoding to realize a desired transmit beam pattern using M-MIMO antenna array 416. The desired transmit beam pattern can be, as described above, such that each of the one or more symbol streams is beamformed to its intended UE.

After processing by antenna array controller 410, the plurality of carrier-modulated signals are coupled to respective antenna elements of the selected subset of M-MIMO antenna array 416 and are transmitted. In an embodiment, the selected subset of M-MIMO antenna array transmits the plurality of carrier modulated signals on the same time and frequency physical resources as described above.

Implementing the second data channel using the second transmit/receive chain of AP 400 is similar to implementing the first communication channel using the first transmit/receive chain as described above. Briefly, in an embodiment, processor 418 is configured to generate a symbol stream corresponding to a control bit stream, to be transmitted to the UE associated with the received channel assignment configuration. The symbol stream is provided to modulator/demodulator 420 which modulates the symbol stream onto appropriate physical resources associated with the second communication channel. The output of modulator/demodulator 420 is then provided to RFIC 422 to generate a carrier-modulated signal. At the control of processor 418 via control signals 436 and 438 respectively, switching module 426 and antenna array controller 424 couple the carrier-modulated signal to one or more respective antenna elements of M-MIMO antenna array 428. In an embodiment, the antenna element(s) of M-MIMO antenna array 428 used to transmit the carrier-modulated signal are selected to produce an omnidirectional or a fixed sector transmit pattern in accordance with the received channel assignment configuration. As would be understood by a person of skill in the art based on the teachings herein, these operations using the second transmit/receive chain can be performed at a same/different time as the operations described above with respect to the first transmit/receive chain.

As would be understood by a person of skill in the art based on the teachings, the above operation description of AP 400 corresponds to one example scenario according to embodiments and is provided for the purpose of illustration only. A myriad of other communication scenarios can be implemented using AP 400 according to embodiments. For example, AP 400 can be used to support any of the above described channel assignment configuration embodiments. For example, as would be apparent to a person of skill in the art, AP 400 can be used to implement a channel assignment configuration whereby both the first and the second transmit/receive chains are used to establish data channels with the UE. Further, both data channels can use the same RAT and both can be M-MIMO RATs or non-MIMO RATs. In addition, in some embodiments, one of the data channels can be a primary data channel and the other data channel can be a secondary data channel, where the secondary data channel may be established/used when the primary data channel fails, when the UE's data traffic exceeds the capacity of the primary data channel, or when the UE's data traffic is of a particular type (e.g., video).

In other embodiments, where processors 402 and 418 implement different RATs, communication related parameters can be shared between processors 402 and 418 so as to enable cross-RAT cooperation. In such embodiments, any type of information available within a given RAT network and which is accessible to AP 400 can be shared between processors 402 and 418. For example, processors 402 and 418 can share such information as the UE's location, uplink/downlink channel estimates, transmit/receive precoders, etc. with each other.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue, experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A central access controller communicatively coupled to a plurality of Access Points (APs), comprising:
   a memory configured to store AP information associated with the plurality of APs and User Equipment (UE) information associated with one or more UEs in a vicinity of the plurality of APs; and
   a processor configured to:
      generate a first channel assignment configuration for a first UE of the one or more UEs based at least in part on the AP information and the UE information, wherein the first channel assignment configuration identifies a first communication channel that is a data channel to be established between at least a first AP of the plurality of APs and the first UE;
      send the first channel assignment configuration to at least the first AP;
      detect an increase in an average burst size of downlink data traffic to the first UE using the first communication channel; and
      generate a second channel assignment configuration for the first UE responsive to the detected increase, wherein the second channel assignment configuration identifies a second communication channel to be established between a second AP of the plurality of APs and the first UE, the second communication channel using a Massive Multiple Input Multiple Output (M-MIMO) radio access technology (RAT).

2. The central access controller of claim 1, wherein the AP information includes information regarding capabilities of the first AP, including information regarding a maximum transmit power of the first AP, supported RATs at the first AP, an antenna configuration of the first AP, M-MIMO communication availability at the first AP, capacity of a backhaul link of the first AP, or latency of the backhaul link of the first AP.

3. The central access controller of claim 1, wherein the UE information includes information regarding the first UE, including information regarding supported RATs at the first UE, an antenna configuration of the first UE, M-MIMO communication availability at the first UE, data traffic characteristics of the first UE, a current serving AP of the first UE, a current receive power at the first UE due to the current serving AP, a current estimate of a downlink channel from the current serving AP to the first UE, a location of the first UE, or a battery level of the first UE.

4. The central access controller of claim 1, wherein the first channel assignment configuration identifies parameters of the first communication channel, including:
 a first RAT of the first communication channel;
 downlink/uplink time and frequency resources associated with the first communication channel; or
 a downlink/uplink modulation and coding scheme (MCS) associated with the first communication channel.

5. The central access controller of claim 1, wherein the M-MIMO parameters include a number of transmit/receive antennas for use in the M-MIMO communication over the second communication channel, a selection between Single User MIMO (SU-MIMO) and Multi-User (MU-MIMO), or a transmit precoder for use in the M-MIMO communication over the second communication channel.

6. The central access controller of claim 1, wherein the first channel assignment configuration further identifies a third communication channel to be established between a third AP of the plurality of APs and the first UE.

7. The central access controller of claim 6, wherein the first communication channel and the second communication channel correspond to a data channel and the third communication channel corresponds to a control channel.

8. The central access controller of claim 6, wherein the first AP corresponds to a small cell AP and the second AP corresponds to a large cell AP.

9. The central access controller of claim 6, wherein the first communication channel and the second communication channel corresponds to a primary data channel and the third communication channel corresponds to a secondary data channel.

10. The central access controller of claim 6, wherein a first RAT of the first communication channel is different than a second RAT of the second communication channel.

11. The central access controller of claim 10, wherein the first RAT is Long Term Evolution (LTE) and the second RAT is Wireless Local Area Network (WLAN).

12. The central access controller of claim 1, wherein the processor is further configured to:
 detect a change in a battery level of the first UE; and
 adjust M-MIMO parameters of the M-MIMO communication over the second communication channel responsive to the detected change.

13. A method performed by a central access controller communicatively coupled to a plurality of Access Points (APs), comprising:
 determining AP information associated with the plurality of APs;
 determining User Equipment (UE) information associated with one or more UEs in a vicinity of the plurality of APs;
 generating a first channel assignment configuration for a first UE of the one or more UEs based at least in part on the AP information and the UE information, wherein the first channel assignment configuration identifies a first communication channel to be established between at least a first AP of the plurality of APs and the first UE, wherein the first communication channel uses Massive Multiple Input Multiple Output (M-MIMO) communication between the first AP and the first UE;
 sending the first channel assignment configuration to at least the first AP;
 detecting a change in a battery level of the first UE; and
 adjusting M-MIMO parameters of the M-MIMO communication aver the first communication channel responsive to the detected change.

14. The method of claim 13, wherein the first channel assignment configuration identifies parameters of the first communication channel, including:
 a first radio access technology (RAT) of the first communication channel;
 downlink/uplink time and frequency resources associated with the first communication channel;
 a downlink/uplink modulation and coding scheme (MCS) associated with the first communication channel; or
 the M-MMIO parameters for the M-MIMO communication over the first communication channel.

15. The method of claim 13, wherein the first channel assignment configuration further identifies a second communication channel to be established between a second AP of the plurality of APs and the first UE.

16. The method of claim 15, wherein the first communication channel corresponds to a primary data channel and the second communication channel corresponds to a secondary data channel, and wherein a first radio access technology (RAT) of the first communication channel is different than a second RAT of the second communication channel.

17. A central access controller communicatively coupled to a plurality of Access Points (APs), comprising:
 a memory configured to store AP information associated with the plurality of APs and User Equipment (UE) information associated with one or more UEs in a vicinity of the plurality of APs; and
 a processor configured to:
  generate a first channel assignment configuration for a first UE of the one or more UEs based at least in part on the AP information and the UE information, wherein the first channel assignment configuration identifies a first communication channel to be established between a first AP of the plurality of APs and the first UE and a second communication channel to be established between a second AP of the plurality of APs and the first UE, and wherein the first communication channel corresponds to a primary data channel and the second communication channel corresponds to a control channel, wherein the first communication channel uses Massive Multiple Input Multiple Output (M-MIMO) communication between the first AP and the first UE,
  send the first channel assignment configuration to the first AP and the second AP;
  detect a change in a battery level of the first UE; and
  adjust M-MIMO parameters of the M-MIMO communication over the first communication channel responsive to the detected change.

18. The central access controller of claim 17, wherein the adjusted M-MIMO parameters include increasing a number of transmit antennas used by the first AP.

19. The central access controller of claim 18, where the adjusted M-MIMO parameters further include decreasing a number of receive antennas used for the first UE.

20. The central access controller of claim 1, wherein the processor is further configured to send the second channel assignment configuration to at least the second AP.

* * * * *

UNITED STATES PATENT AND TRADEMARK OFFICE
CERTIFICATE OF CORRECTION

PATENT NO. : 9,125,081 B2  
APPLICATION NO. : 14/213031  
DATED : September 1, 2015  
INVENTOR(S) : Paulraj et al.

Page 1 of 1

It is certified that error appears in the above-identified patent and that said Letters Patent is hereby corrected as shown below:

IN THE CLAIMS

Column 13, Lines 35-36. Please replace "second communication channel corresponds" with --second communication channel correspond--.

Column 14, Line 51. Please replace "first UE," with --first UE;--.

Column 14, Line 60. Please replace "claim 18, where" with --claim 18, wherein--.

Signed and Sealed this  
Twenty-second Day of March, 2016

Michelle K. Lee  
*Director of the United States Patent and Trademark Office*